United States Patent [19]

Gibson

[11] Patent Number: 4,705,494
[45] Date of Patent: Nov. 10, 1987

[54] MOTORCYCLE CHAIN DRIVE

[76] Inventor: Gary S. Gibson, 1661 Deer Run, Gurnee, Ill. 60031

[21] Appl. No.: 803,247

[22] Filed: Dec. 2, 1985

[51] Int. Cl.$^4$ ............................................. F16H 7/08
[52] U.S. Cl. .................................. 474/109; 474/148
[58] Field of Search ............... 474/148, 150, 109, 111; 180/227, 231

[56] References Cited

U.S. PATENT DOCUMENTS

| | | | |
|---|---|---|---|
| 4,018,095 | 4/1977 | Shimano | 474/148 |
| 4,299,582 | 10/1981 | Leitner | 474/109 |
| 4,533,341 | 8/1985 | Yokota | 474/109 |

FOREIGN PATENT DOCUMENTS

| | | | |
|---|---|---|---|
| 2337145 | 3/1974 | Fed. Rep. of Germany | 180/231 |
| 0811015 | 5/1981 | U.S.S.R. | 180/231 |

*Primary Examiner*—Stephen J. Novosad
*Assistant Examiner*—William P. Neuder
*Attorney, Agent, or Firm*—Douglas B. White

[57] ABSTRACT

There is provided chain deflecting means such as rollers, sprockets or guides affixed to the cycle frame independent of the swing arm. This chain deflecting mechanism, arranged to guide and control the location of the chain with respect to the engine drive, is placed rearward of the swing arm pivot point at a location which minimizes the effect of the drive system on the swing arm motion.

3 Claims, 4 Drawing Figures

MOTORCYCLE CHAIN DRIVE

BACKGROUND OF THE INVENTION

The present invention relates generally to motorcycle drives and more particularly to chain drives for motorcycles utilizing chain deflecting mechanisms to minimize the effects of the drive on the rear wheel suspension.

Modern motorcycles, particularly those used for off-road purposes, commonly use a suspension system referred to as a trailing link or rear swing arm. With this suspension, the rear wheel is linked to the frame by a pivotal swing arm with a chain drive connecting the frame mounted engine to the rear wheel sprocket.

In this type of system, forces acting on the swing arm, including drive related forces, determine its position or angle with respect to the frame. It is an objective in the art, however, to achieve constant chain tension over the full range of swing arm travel and to minimize the effect of drive forces on the swing arm action. In the previously issued patent to Horst Leitner, U.S. Pat. No. 4,299,582, there has been described a certain chain deflecting mechanism rigidly secured to the swing arm and having dual chain sprockets spaced apart above and below the swing arm bearing to spread the chain and thereby affect chain tension during the motion of the swing arm. It has been the prevailing opinion in the industry, as exemplified by the abovecited patent, that a chain deflecting mechanism mounted to the swing arm provides the best isolation from drive interference with the suspension. Similarly, in U.S. Pat. No. 4,034,821, issued to Stoddard, et al., there are shown chain sprockets mounted to the swing arm and arranged to pinch the chain toward the swing arm to control the tension without regard to suspension compliance. However, Applicant's invention embodies the positioning of a chain deflecting means on the fixed frame to more effectively isolate the suspension from drive related forces. Particularly, mounting of chain deflecting rollers or sprockets to the frame at a location behind the swing arm pivot achieves the desired isolation. The exact coordinates for the location are dependent upon the dimensions of the drive train and vehicle geometry and can be ascertained mathematically.

SUMMARY OF THE INVENTION

In the preferred embodiment of the present invention there is provided chain deflecting means such as rollers, sprockets or guides affixed to the cycle frame independent of the swing arm. This chain deflecting mechanism, arranged to guide and control the location of the chain with respect to the swing arm pivot, is placed rearward of the swing arm pivot point and, in the preferred embodiment, above the swing arm at a location which minimizes the effect of the drive forces on the rear suspension system. This position can be mathematically determined for a given geometry of the cycle as follows:

The desired h (projected height of the chain from the swing arm pivot point) versus the angle of the swing arm is calculated for each of three angles, fully compressed, fully extended, and the average (intermediate) of these two angles. The height is calculated directly from the formula $$h = \frac{Rs(Rw - M\sin(A2))}{Rw} - \frac{Rs(H0 - M\sin(A2))L\cos(A1)}{Rw(L\cos(A1) + M\cos(A2))}$$

where
TH = swing arm angle
$A2 = \arctan(L\sin(TH)/(M+L\cos(TH)))$
$A1 = TH - A2$
Rs = rear drive sprocket radius
Rw = rear wheel radius
L = swing arm length
H0 = center of gravity height when TH = 0
M = distance from swing arm pivot to front axle This calculation then yields three values (hc, hex, hi) for the desired h corresponding to the three swing arm angles (compressed, extended and intermediate). The effect of locating the idler roller axles at chosen coordinates can be tested by iteratively finding the location which yields a projected height which matches the calculated desired height at each of the three angles. The projected height for a given roller location is given by the equation $$hs = Rs - L\sin(A3 + A4 - TH)$$

where
Rs = rear drive sprocket radius
L = swing arm length
TH = swing arm angle
$A3 = \arctan((Y4-Y2)/(X4-X2))$
$A4 = \arcsin((R5-R2)/(AB))$
(X2,Y2) = coordinates of lower idler roller axle
(X4,Y4) = coordinates of rear drive sprocket center
R2 = idler roller radius (positive for lower roller; negative for upper roller)
AB = distance between idler roller axle and rear drive sprocket center Other objects and advantages of the invention will become apparent upon reading the following detailed description and upon reference to the drawings.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
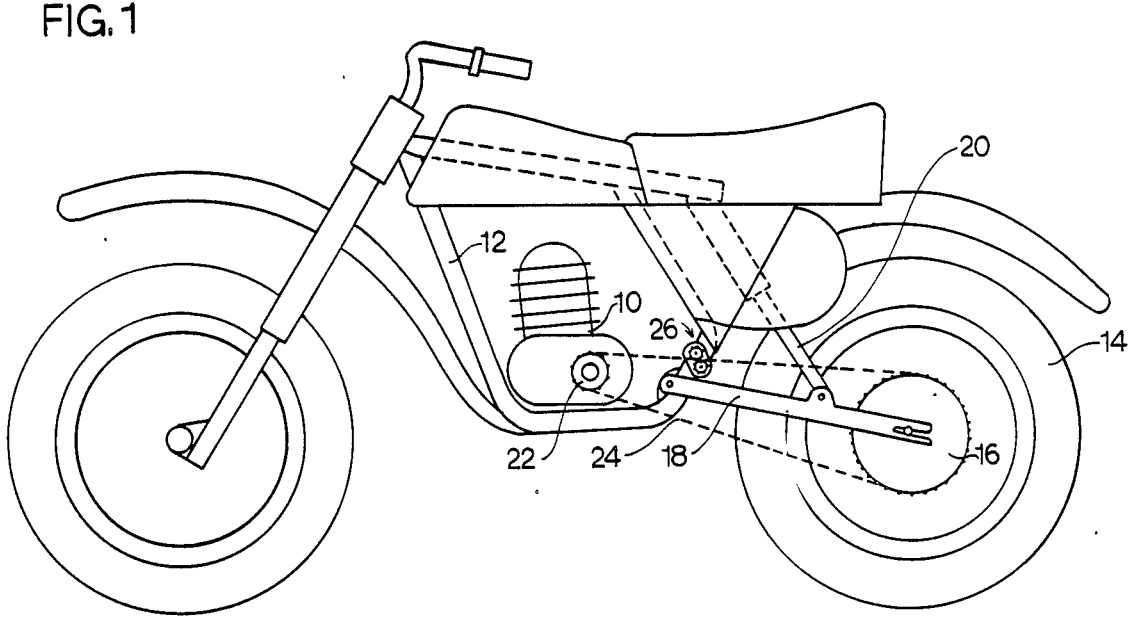
FIG. 1 is a pictorial view of a motorcycle having a chain drive, swing arm and frame mounted chain deflecting mechanism.
Figure 2:
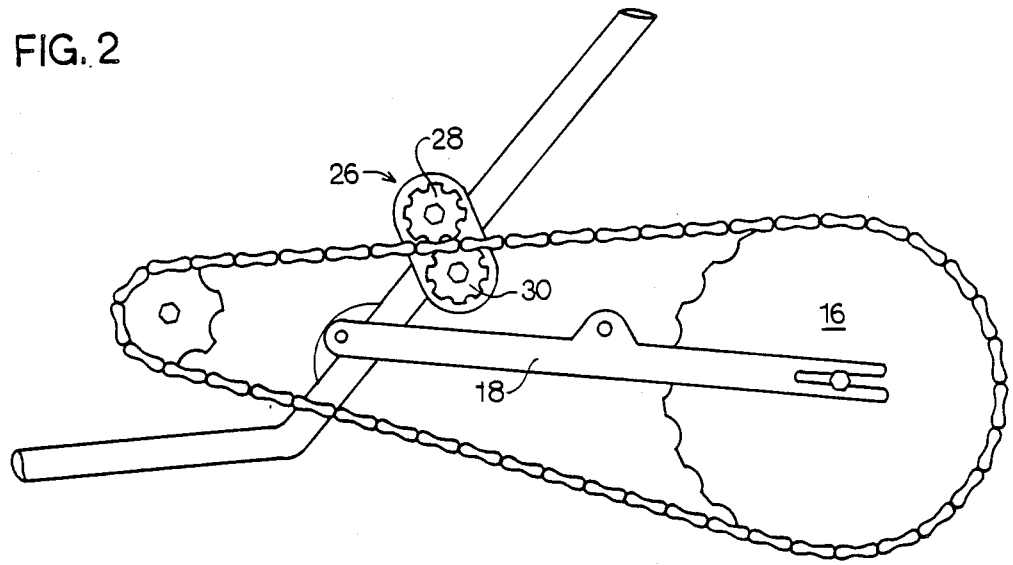
FIG. 2 is a detailed view of the chain drive of FIG. 1 showing the chain deflecting mechanism.

Turning first to FIG. 1 there is shown a pictorial view of a motorcycle having an engine 10 mounted within a frame 12. A rear wheel 14 having a sprocket 16 is mounted to the frame by a pivotal swing arm 18 and shock absorbing suspension 20. A roller chain drive is provided wherein a sprocket 22 driven by the engine engages a roller chain 24 to drive the rear sprocket 16. In the preferred embodiment of the present invention, a chain deflecting mechanism 26 is affixed to the motorcycle frame and comprised of an upper sprocket 28 and a lower sprocket 30. During upward movement (compressed angles) of the swing arm 18, the upper sprocket 28 deflects the chain in a downward direction. During downward motion (extended angles) of the swing arm 18, the lower sprocket 30 deflects the chain in an upward direction. These chain deflecting sprockets are each mounted for free-wheeling motion upon axes fixed to the frame. Since these deflection sprockets are affixed to the frame and not to the swing arm as in the prior art, the forces that are acting on the swing arm can now be more effectively neutralized and, in particular, can be neutralized throughout the entire range of the swing arm angle.

Figure 3:
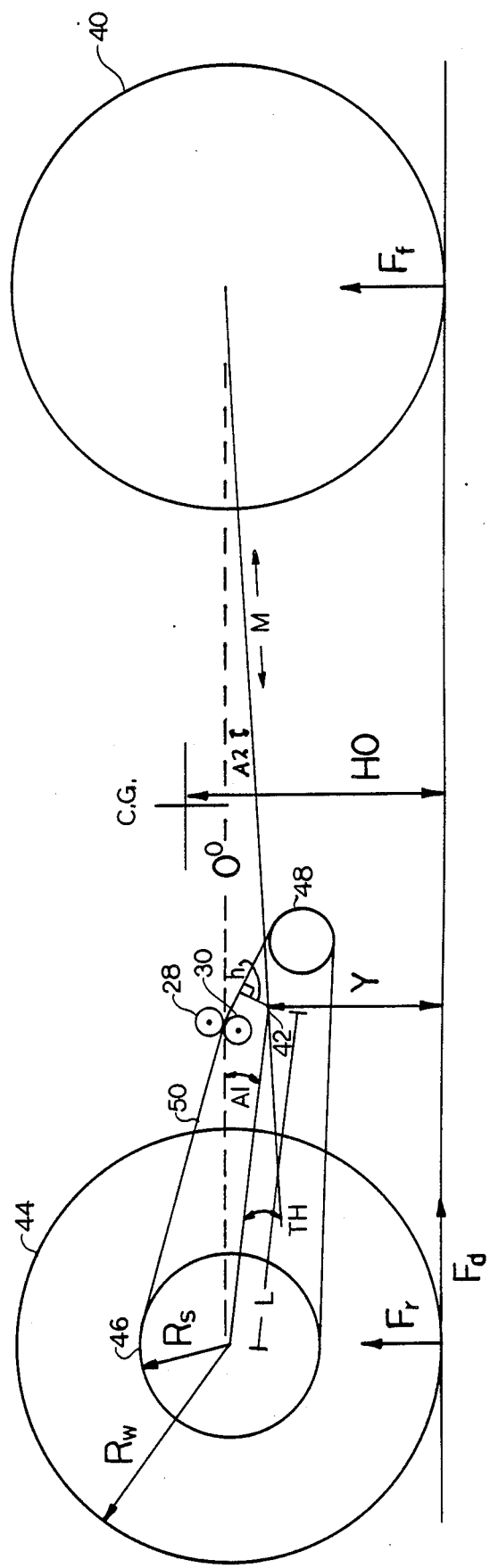
FIG. 3 is a geometrical diagram of the motorcycle of FIG. 1 indicating the geometrical variables involved in obtaining the optimum position of the chain deflecting mechanism.

The proper location of the deflection sprockets is best understood by reference to FIG. 3 where a geometrical diagram is shown depicting the principal parts of the motorcycle and drive train schematically. Particularly, the front wheel 40 is shown displaced a distance M from the swing arm pivot point 42, and the rear wheel 44 having a sprocket 46 mounted thereon is positioned rearward of the pivot point 42 by a swing arm of length L. A drive sprocket 48 drives a roller chain 50 which engages the drive sprocket 46 of the rear wheel.

It can be shown that forces Fr, Fd, and Fch are external forces acting to create torques upon the swing arm. It is the principal objective of this invention to minimize the sum of these torques acting about the pivot point. This is accomplished by choosing a distance h defined as the projected height of the chain from the pivot point as shown in FIG. 3. When the torques about the pivot point are mathematically balanced, the following equation is obtained:

$$h = \frac{Rs(Rw - M\sin(A2))}{Rw} - \frac{Rs(H0 - M\sin(A2))L\cos(A1)}{Rw(L\cos(A1) + M\cos(A2))}$$

where
 TH=swing arm angle
 A2=arc tan(Lsin(TH)/M+Lcos(TH)))
 A1=TH-A2
 Rs=rear drive sprocket radius
 Rw=rear wheel radius
 L=swing arm length
 H0=center of gravity height when TH=0
 M=distance from swing arm pivot to front axle Accordingly it can be seen in the above equation that when TH=0 (the level swing arm condition) and H0=0 (no weight transfer taking place) the equation may be simplified to h=Rs. This is the result that had been assumed for all swing arm angles in the prior art as described in the patent issued to Leitner, U.S. Pat. No. 4,299,582. As shown in the above equation, in the present invention the projected height of the chain from the swing arm should vary according to the angle of the swing arm; it should not be fixed with the swing arm. Thus it is the principal objective of the present invention to provide means for controlling the parameter h such that it would increase on extension of the swing arm and decrease on compression of the swing arm. This would virtually eliminate the effects of the applied drive power on the rear suspension.

Figure 4:
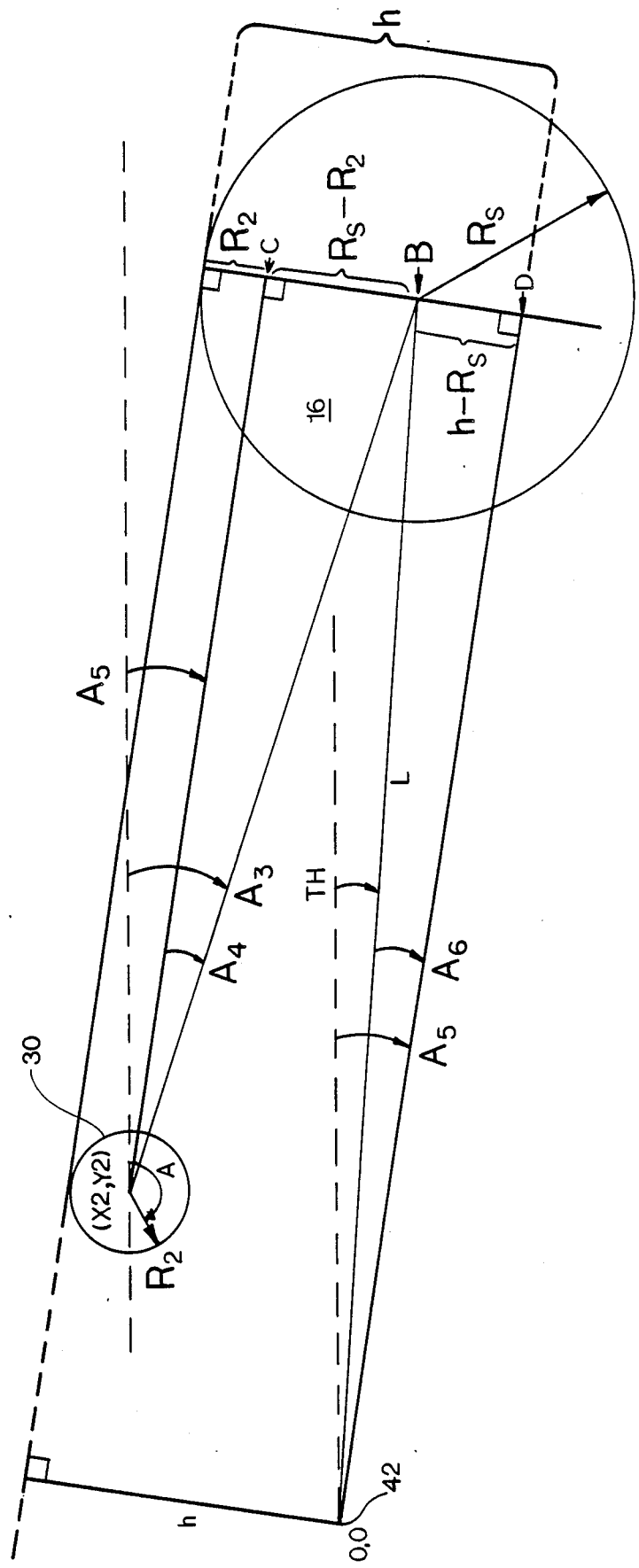
FIG. 4 is a geometrical diagram of the swing arm and chain deflecting mechanism of FIG. 2.

The projected height h may also be calculated as a function of the location of the idler rollers. The projected height for a given location of the lower roller is given by the equation $$h = Rs - L\sin(A3 + A4 - TH)$$

where
 Rs=rear sprocket radius
 L=swing arm length
 TH=swing arm angle
 A3=arc tan ((Y4−Y2)/(X4−X2))
 A4=arc sin ((Rs−R2)/AB)
 (X2,Y4)=coordinates of lower idler roller axle
 (X4,Y4)=coordinates of rear drive sprocket center
 R2=idler roller radius (postive for lower roller; negative for upper roller)
 AB=distance between idler roller axle and rear drive sprocket center The desired location of the rollers can now be obtained by applying iteration techniques to the foregoing equations. Using computer analysis and varying the coordinates of the chain deflecting sprockets, an optimum solution for the roller coordinates can be selected which provides the calculated h required to minimize the effect of drive forces on the suspension. For calculations, it should be assumed that the pivot point of the swing arm is at coordinates X=0 and Y=0 (FIG. 4); the chain deflecting sprocket 30 is positioned at coordinates (X2,Y2); the rear wheel drive sprocket 16 is located at the rearward end of the swing arm a distance L from the pivot point; and the swing arm is deflected by angle TH from its unloaded alignment.

For the interative technique, the desired h (projected height of the chain from the pivot point) versus the angle of the swing arm is calculated for each of three angles, fully compressed, fully extended, and the average (intermediate) of these two angles. The desired height h is calculated directly from the formula $$h = \frac{Rs(Rw - M\sin(A2))}{Rw} - \frac{Rs(H0 - M\sin(A2))L\cos(A1)}{Rw(L\cos(A1) + M\cos(A2))}$$

where
 TH=swing arm angle
 A2=arc tan (Lsin(TH)/(M+Lcos(TH)))
 A1=TH-A2
 R2=rear drive sprocket radius
 Rw=rear wheel radius
 L=swing arm length
 H0=center of gravity height when TH=0
 M=distance from swing arm pivot to front axle This calculation then yields three values (hc, hex, hi) for the desired h corresponding to the three swing arm angles (compressed, extended and intermediate). The effect of locating the idler roller axle at chosen coordinates can be tested by iteratively finding the location which yields a projected height which matches the calculated desired height at each of two angles. The lower roller is located by matching the projected height to the desired height for the fully extended angle (hex) and the desired height for the intermediate angle (hi) The projected height for given roller locations is given by the equation $$h = Rs - L\sin(A3 + A4 - TH)$$

where
 Rs=rear sprocket radius
 L=swing arm length
 TH=swing arm angle

A3 = arc tan (Y4−Y2)/(X4−X2))
A4 = arc sin ((Rs−R2)/(AB))
(X2,Y2) = coordinates of lower idler roller axle
(X4,Y4) = coordinates of rear drive sprocket center
R2 = idler roller radius (positive for lower roller; negative for upper roller)
AB = distance between idler roller axle and rear sprocket center When the height h for a given roller location matches closely for both angles the desired h calculated to minimize the effect of drive relates forces, the desired position has been obtained. The position of the upper idler roller is then located by a similar procedure where the two angles are the fully compressed angle and the intermediate angles and where the radius of the idler roller radius is expressed as a negative number.

Accordingly there has been shown and described an improved chain drive system comprising a chain deflecting mechanism mounted independent of the swing arm. This chain deflecting mechanism, arranged to guide and control the location of the chain with respect to the swing arm pivot, is placed rearward of the pivot point at a location which minimizes the effect of the drive system on the swing arm motion. This position can be determined mathematically for a given geometry of the cycle using iterative techniques.

I claim:

1. A rear wheel chain drive having a driven roller chain therein comprising:
   a. a frame member;
   b. a drive sprocket mounted within said frame for engaging the chain;
   c. a swing arm pivotally mounted to the frame at a first end thereof;
   d. a rear wheel mounted to rotate with respect to said swing arm at the second end thereof;
   e. a driven sprocket disposed on said rear wheel adapted to engage the chain; and
   f. chain deflecting means mounted to the frame rearward of said swing arm pivot and above said swing arm between the drive sprocket and the driven sprocket for engaging the span of chain under drive tension for neutralizing the resultant effect on the swing arm by the chain tension.

2. The device of claim 1 wherein said chain deflecting means is comprised of freewheeling chain engaging sprockets.

3. The device of claim 1 wherein the chain deflecting means are located such that the projected height of the chain is determined by the equation $$h = \frac{Rs(Rw - M\sin(A2))}{Rw} - \frac{Rs(H0 - M\sin(A2))L\cos(A1)}{Rw(L\cos(A1) + M\cos(A2))}$$

where
TH = spring arm angle
A2 = arc tan(L sin(TH)/(M+L cos(TH)))
A1 = TH−A2
Rs = rear drive sprocket radius
Rw = rear wheel radius
L = swing arm length
H0 = center of gravity height when TH = 0
M = distance from swing arm pivot to front axle.

* * * * *

UNITED STATES PATENT AND TRADEMARK OFFICE
CERTIFICATE OF CORRECTION

PATENT NO. : 4,705,494

DATED : November 10, 1987

INVENTOR(S) : Gary S. Gibson

It is certified that error appears in the above-identified patent and that said Letters Patent is hereby corrected as shown below:

Column 4, line 31, delete the word "interative" and insert therefor the word --iterative--.

Signed and Sealed this

Seventeenth Day of May, 1988

Attest:

Attesting Officer

DONALD J. QUIGG

Commissioner of Patents and Trademarks